(12) United States Patent
Ioannou

(10) Patent No.: US 8,181,181 B2
(45) Date of Patent: May 15, 2012

(54) TASK-OPTIMIZING CALENDAR SYSTEM

(75) Inventor: Andrew Ioannou, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 908 days.

(21) Appl. No.: 12/233,994

(22) Filed: Sep. 19, 2008

(65) Prior Publication Data

US 2010/0077400 A1   Mar. 25, 2010

(51) Int. Cl.
*G06F 9/46* (2006.01)
*G06Q 10/00* (2012.01)

(52) U.S. Cl. ...... 718/102; 718/104; 705/7.18; 705/7.19; 705/7.21; 705/7.22; 705/5

(58) Field of Classification Search ........................ None
See application file for complete search history.

(56) References Cited

U.S. PATENT DOCUMENTS

| | | | |
|---|---|---|---|
| 5,855,006 | A | 12/1998 | Huemoeller et al. |
| 6,442,527 | B1 | 8/2002 | Worthington |
| 7,318,040 | B2 * | 1/2008 | Doss et al. .................... 705/7.16 |
| 7,519,624 | B2 * | 4/2009 | Korupolu et al. ...................... 1/1 |
| 7,761,530 | B2 * | 7/2010 | Cain et al. ...................... 709/213 |
| 2006/0069604 | A1 | 3/2006 | Leukart et al. |
| 2006/0074844 | A1 | 4/2006 | Frankel et al. |
| 2006/0190943 | A1 * | 8/2006 | Haeri ........................... 718/103 |

OTHER PUBLICATIONS

The Calendar Planner, "Scheduling Calendar", .thecalendarplanner. com/schedulingcalendar.php, 2002-2008 Reel Logix, Inc.
Microsoft, "Managing Your Time Using Outlook", download. microsoft.com/download/5/5/7/55782179-604e-4b22-a5cb-a2289ed612bf/outlookTpreview.doc ehow.com/how__14632__ schedule-time-outlook.html, 1999 Microsoft Corporation.
JobTraQ, "JobTraQ", .jobtraq.com/jobtraq-features/jobtraq-screen-shots.asp, 2007 Swift Software, Inc.
JetTask, "JetTask", .jettask.com/, 2007 Clearcove Ltd.
BPSSOFT, "Always on Time", .softsea.com/review/Always-On-Time.html.
Pollen Software, "Task-O-Matic", pollensoftware.com/task-o-matic/index.html, 2001-2006 Pollen Software.
Softpedia, "On Time Calendar 1.65", .softpedia.com/get/Office-tools/Diary-Organizers-Calendar/HJ-OnTime.shtml, 2001-2008 Softpedia.
Source Forge, "My Task Scheduler v1.0", /sourceforge.net/projects/mytaskscheduler/, 1999-2008 Source Forge, Inc.
Softalizer.com, "eTaskSchedular", etaskscheduler.mdccindia-technologies.softalizer.com/, 2006 Softalizer.com.
MyLife Organized, "My Life Organized", .mylifeorganized.net/, 2004-2008 mylifeorganized.net, Inc.
Oracle, "Oracle Collaboration Suite 10g Calendar Overview", Aug. 2005, Oracle.
Oracle, "Oracle Collaboration Suite 10g Calendar Overview", Jun. 2005, Oracle.

* cited by examiner

*Primary Examiner* — Camquy Truong
(74) *Attorney, Agent, or Firm* — Squire Sanders (US) LLP

(57) ABSTRACT

A calendar system schedules tasks and meetings or other appointments for a user. The system retrieves a work capacity, which is information regarding the working hours for the user. The system further retrieves a plurality of enhanced tasks for the user. The system then optimizes a schedule for the user based on the work capacity and the enhanced tasks.

16 Claims, 11 Drawing Sheets

TASK-OPTIMIZING CALENDAR SYSTEM

FIELD OF THE INVENTION

One embodiment is directed generally to a computer system, and in particular to an computerized calendar system.

BACKGROUND INFORMATION

Many calendar computer systems exist that primarily keep track of a user's daily schedule. Known calendar systems may include fairly sophisticated tools for organizing and scheduling meetings. However, these known systems tend to be stand-alone systems that merely keep track of scheduled items that are input by the user directly into the calendar application, without integrating with other relevant data.

SUMMARY OF THE INVENTION

One embodiment is a calendar system that schedules tasks and meetings or other appointments for a user. The system retrieves a work capacity, which is information regarding the working hours for the user. The system further retrieves a plurality of enhanced tasks for the user. The system then optimizes a schedule for the user based on the work capacity and the enhanced tasks.

DETAILED DESCRIPTION

One embodiment is a calendar system that is integrated with task information. The system optimizes a user's schedule based on their working hours and location, their fixed appointments in their calendar and their pending tasks.

In contrast to embodiments of the invention, below is a separate schedule and task list that may be found in prior art calendar/task list applications:

Schedule for Monday
    8:00-9:00 am: Project Kick Off Meeting;
    2:00-3:00 pm: Meet with Performance Team.
Current Task List
    Write Up Project Kick Off Minutes;
    Call John to discuss Infrastructure needed for New Release;
    Complete Patent Disclosure;
    Work on Data Model Open Issues;
    Book Flight and Hotel for Off-Site Meeting in Paris;
    Write Functional Specification for Sales Orders Module;
    Call Aquarium to see if they have Clown Fish;
    Write Email on thoughts on Group Model.

One major drawback in this separation of schedule and tasks is that it is up to the user to juggle the tasks at hand to make sure they all get done by certain deadlines while at the same time keeping track of the fixed meetings already present in their calendar. Typically, users find it difficult to manage many tasks and deadlines simultaneously. For example, tasks may be completed in the wrong order so that although the work gets done, the correct deadlines are not met, which further impacts other project plans.

Specific problems may arise because the task list and schedule are unrelated. For example, a task which requires a couple of hours of uninterrupted thought gets started 45 minutes before an unrelated meeting, or a user gets booked up into too many meetings which does not leave enough time to work on tasks with hard deadlines. Another problem that arises with prior art non-integrated task lists is "butterflying" in which the task list grows in length and people spend much of their time scanning the task list and worrying about things they need to do rather than actually doing them, or which causes them to start one task only to move onto something else that seems more urgent before the first task is completed. These types of actions are very unproductive.

Figure 1:
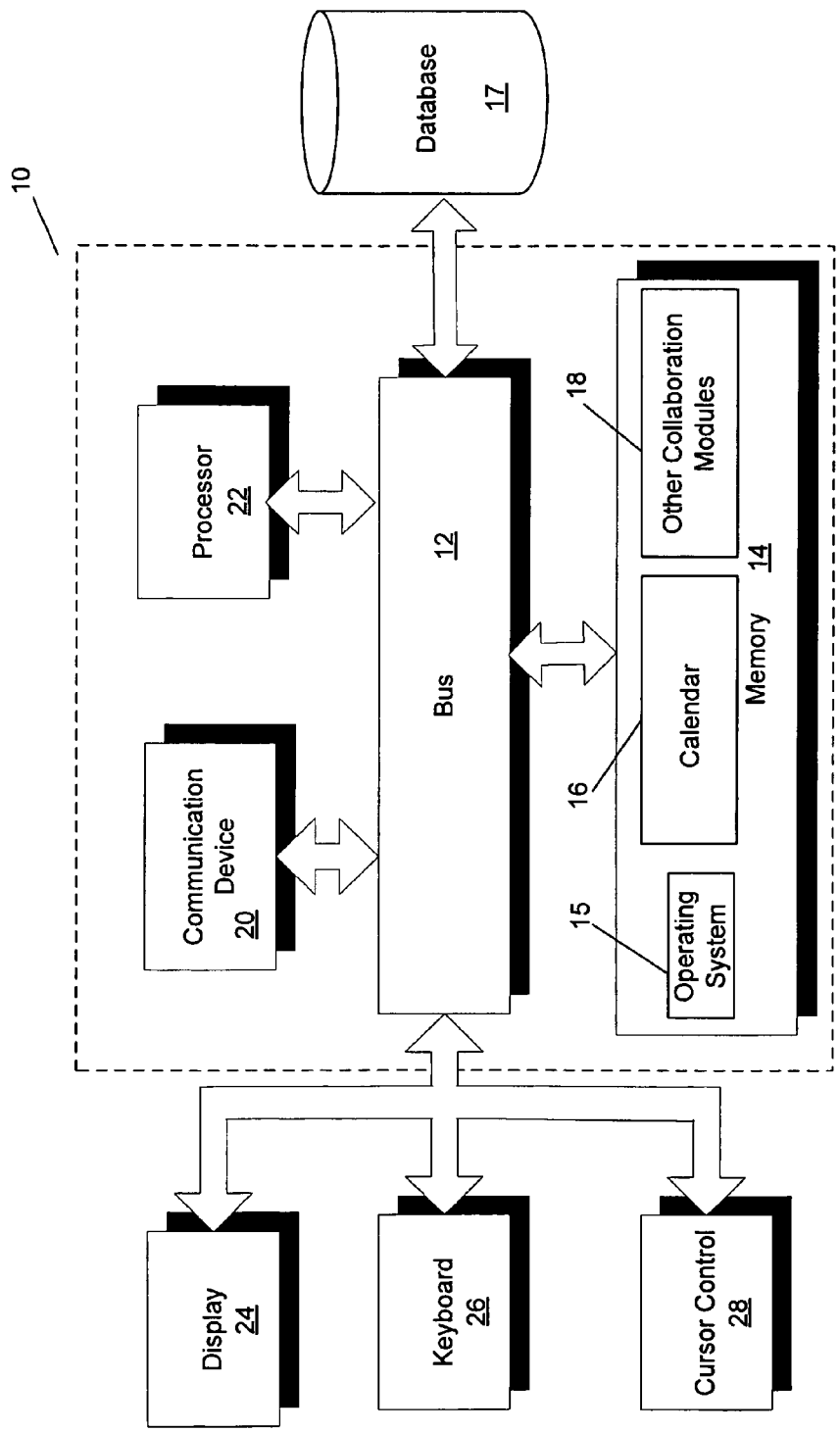
FIG. 1 is a block diagram of a system that can implement an embodiment of the present invention.

FIG. 1 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a calendar module 16 that performs task-optimized calendaring functions, as disclosed in more detail below. The modules further include other collaboration modules 18 that may be part of an integrated system, such as the "Oracle Collaboration Suite" from Oracle Corp. The other collaboration modules 18, in one embodiment, provide the functionality of email, voicemail and fax, mobile access and real-time collaboration. A unified database 17, coupled to bus 12, is used to store data for the various system modules. In other embodiments, calendar module 16 may be a stand-alone system and not integrated with other modules, or may be part of any other type of integrated system.

Figure 2:
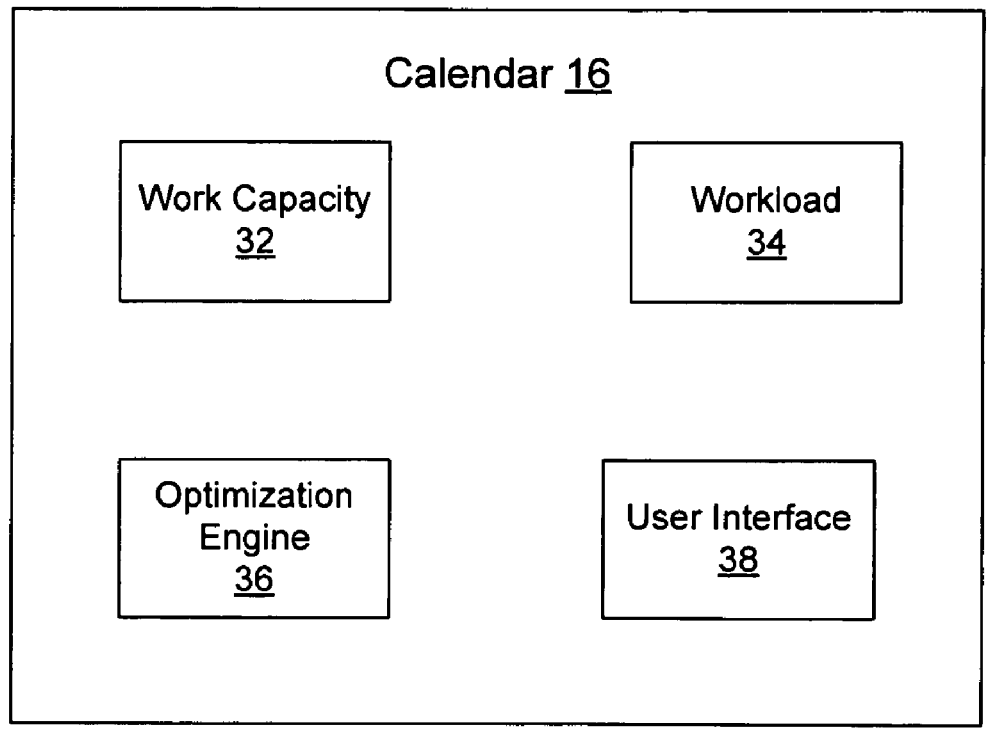
FIG. 2 is a block diagram of the modules that comprise a calendar in accordance with one embodiment.

FIG. 2 is a block diagram of the modules that comprise calendar 16 in accordance with one embodiment. Calendar 16 includes a work capacity module 32. Work capacity 32 provides a representation of the user's working hours and resources, which is a measurement of the user's capacity to do work. Calendar 16 further includes a workload module 34, which is a measurement of the user's workload, such as a list of tasks. The tasks may be fixed in time, such as with appointments/meetings, or may include an estimated duration. Workload 34 may further include the specific resources that are needed for a task to be completed in order that it can be optimally positioned in the user's schedule, and any deadlines or dependencies for the task.

Calendar 16 further includes an optimization engine 36. Optimization engine 36 generates an optimal schedule based on at least the following: (1) The tasks that are fixed in time (e.g., appointments/meetings); (2) The user's working hours and resources; (3) The estimated duration of tasks that are not fixed in time; (4) Deadlines; (5) Dependencies between tasks; and (6) User preferences regarding the optimization.

Finally, calendar 16 includes user interface 38 that generates a user interface which provides at least the following functionality: (1) Allows the user to set up the representation of working hours/resources and the tasks to be completed (fixed in time or otherwise); (2) Allows the user to control the generation of an optimal schedule; (3) Allows the user to manually override the optimized schedule and allow real time re-optimization to occur as the user works through their schedule. Examples of manual updates that may trigger re-optimization include the user overrunning a task, and the user wanting to move on to another task when the existing task is not 100% complete, the user declining to work on the scheduled task because of a desire to work on something different; and (4) Alerts the user to situations where deadlines cannot be met.

Work capacity 32 includes a work day outline in one embodiment, which is an outline of the user's working hours and work locations. In general, a user will have some regularity to their work patterns even if they have several different types of working days. For example, a software engineer typically may have two types of working days, working at home and working at the office:

(1) Working at Home
   7:30 am-8:00 am: Read and Respond to Urgent Email
   8:00 am-10:00 am: Meetings with Europe/Asia
   10:00 am-12:00 pm: Work
   12:00 pm-1:00 pm: Lunch
   1:00 pm-5:30 pm: Work
(2) Working at the Office
   7:30 am-8:00 am: Drive In
   8:00 am-10:00 am: Meetings with Europe/Asia
   10:00 am-12:00 pm: Work
   12:00 am-1:00 pm: Lunch
   1:00 pm-5:00 pm: Work
   5:00 pm-5:30 pm: Drive Home The user will define the typical types of day they have in advance. These templates are used as a starting point for optimization engine 36 to add tasks to the calendar. For example, if the user indicates that on Wednesday they will be "working at home", optimization engine 36 knows that, for Wednesday, it can schedule tasks up to 5:30 pm. Further, the user may also add the resources available for each segment when setting up the work day outline. For example, the user may note the availability of a phone during the "Drive In" segment so that optimization engine 36 could schedule a short phone call during that time. Further, a user may indicate that they are able to read documents over lunch so that optimization engine 36 can schedule reading tasks during the "lunch" segment. The above example is a fairly complex work day outline. However, other users may simply indicate that they always work 9 am-5 pm, Monday-Friday.

In order that tasks can be scheduled correctly, in one embodiment workload 34 includes information that is not typically included in a prior art task list. This information includes:

Estimated task duration—given in hours or a % of working time over a given period;

Must the task be done all at once or can it be split up. If the task can be split, the minimum duration of a segment. This is typically appropriate for tasks that have a long duration. For example, if the task is to work on a document for 20 hours, the user can specify that the task may be split up but not into segments of less than 2 hours;

Completion deadline, if any;

Delayed start—a task might not be able to start until a certain date/time—if appropriate;

Dependency on other tasks (i.e., a task must be done before or after other tasks), if any;

Resources required (e.g., internet connection, phone), if known;

Task classification (e.g., straightforward, thoughtful, document review). This could be relevant if the user prefers to do certain types of tasks at certain times.

In one embodiment, optimization engine 36 works with the available information to generate a schedule for the user based on task properties and the work day outlines assigned. Optimization engine 36 also takes into account user optimization preferences which function as constraints for the optimization. For example, a user may prefer a 10 minute break between all tasks, or a user may prefer a 10 minute break between most tasks but not in the case where the tasks are 30 minutes or less in duration.

Figure 3:
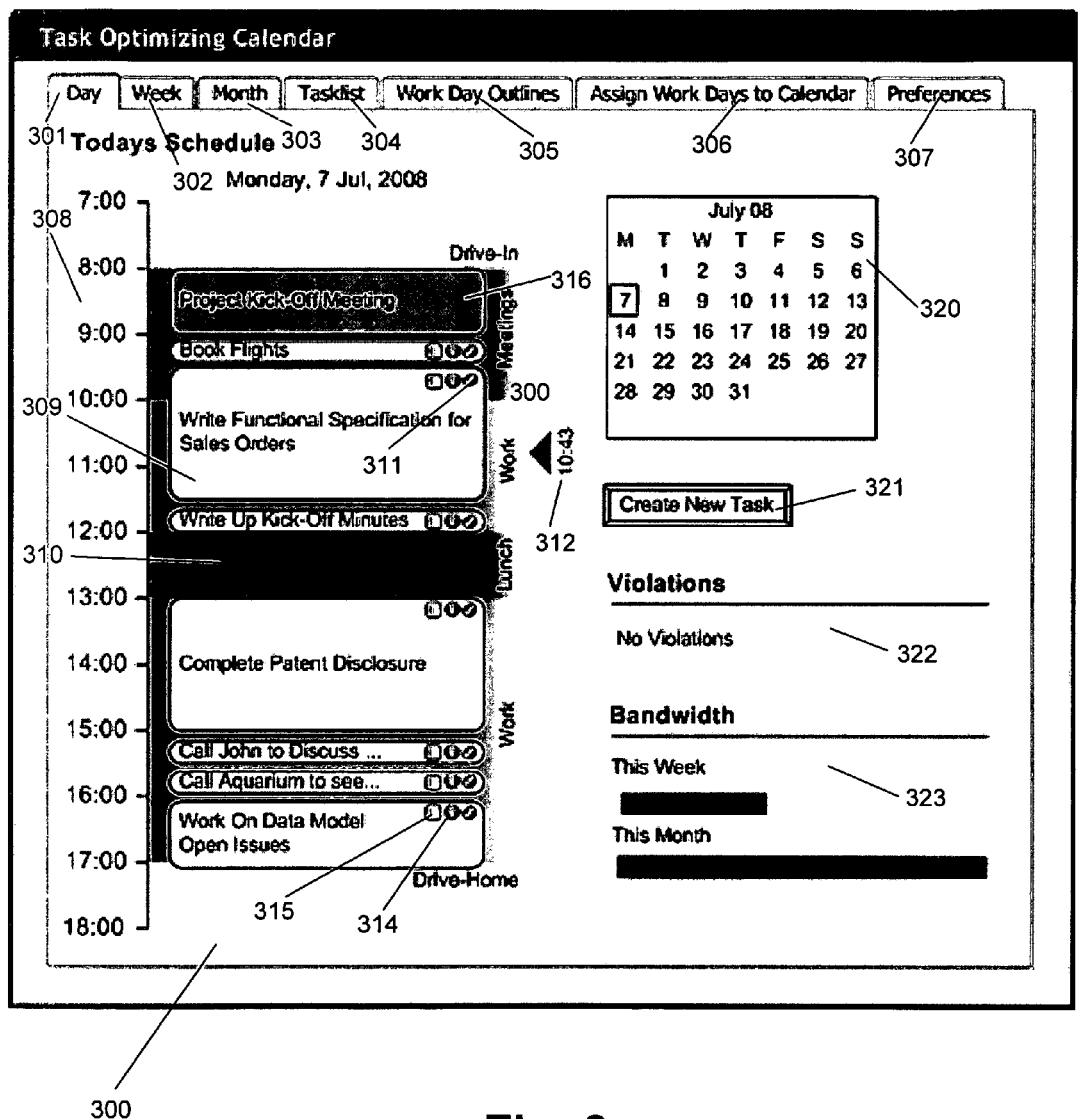
FIG. 3 illustrates a user interface in accordance with one embodiment.

User interface 38 generates user interfaces ("UI"s) that allow a user to interact with calendar module 16. FIG. 3 illustrates a user interface 300 in accordance with one embodiment. UI 300 includes tabs 301-307. Tab 301 displays the schedule for a day. Tab 302 displays the schedule for a week. Tab 303 displays the schedule for a month. Tab 304 allows the user to create and maintain tasks. Tab 305 allows the user to define the work day outlines that are used by optimization engine 36 to understand the user's capacity to do work. Tab 306 allows the user to assign a work day outline to specific calendar days. Tab 307 allows the user to set schedule optimization preferences.

UI 300 displays the current optimized schedule. In the example of FIG. 3, the schedule for the day is displayed. The schedule includes a timeline 308, a current time 312, and the current task 309. Current task 309 is highlighted via, for example, a colored border, so that the user can recognized that the task is current. The schedule includes a background region 310 that has labels and possibly colors that are coordinated with the work day outline assigned to the day. Tasks that are fixed in time, such as task 316 which is a meeting, are a different color from non fixed in time tasks. A task includes a task completion icon 311, a task progress icon 315, and a task details icon 314. A user can select these icons to view detailed information.

UI 300 further includes a calendar 320 for the entire month that can be used to navigate to any date. The current date is indicated by a box. UI 300 further includes a create new task button 321 that provides a quick way of adding a task, and a violations section 322 that displays scheduling violations. UI 300 further includes a bandwidth section 323 that gives the user a visual indication of the number of hours scheduled and the number of hours that are available for new tasks. In one embodiment, bandwidth section 323 includes bar graphs for the current week and for the current month.

As an example of how calendar 16 operates in accordance with one embodiment, the interaction with calendar 16 during a single day by a user is described. For the example, it is assumed that it is a Monday and the tasks to be completed are the same as disclosed in the example above when describing the separate schedule and task list that may be found in prior art calendar/task list applications. The list below is the prior art tasks but also includes the added attributes needed for optimization to form an "enhanced" task list. These extra details have been entered through UI 300 and are therefore available to calendar 16:

Write Up Project Kick Off Minutes (20 minutes, must take place after 'Project Kick Off Meeting');

Call John to discuss Infrastructure needed for New Release (20 minutes, must be done by end of Monday);

Complete Patent Disclosure (2 hours, has to be done in one sitting, complete by end of Tuesday);

Work on Data Model Open Issues (10 hours, has to be done by Friday—can split work into chunks of not less than 1 hour);

Book Flight and Hotel for Off-Site Meeting in Paris (20 minutes, must be done by end of Monday);

Write Functional Specification for Sales Orders Module (20 Hours by Friday, can split work into chunks of not less than 2 hours);

Call Aquarium to see if they have Clown Fish (15 minutes, must be done by end of Monday, and not 1:00 pm-2:00 pm since they are closed for lunch);

Write Email on thoughts on Group Model (20 minutes, must be done by Wednesday).

Further, the same meetings as described above in conjunction with the prior art are scheduled and entered into the user's schedule so that they are available to calendar 16:

8:00 am-9:00 am: Project Kick Off Meeting;

2:00 pm-3:00 pm: Meet with Performance Team.

It is further assumed that user preferences are set to allow a 10 minute break between tasks where possible, and the user has marked Monday as a "work day".

The following is the day outline the user set up for a "work day" in the example. This outline is the same as in the prior art example above but includes extra information in brackets that is used by calendar 16.

7:30 am-8:00 am: Drive In [do not schedule tasks here];

8:00 am-10:00 am: Meetings with Europe/Asia [keep time free until 2 days prior but then schedule tasks here];

10:00 am-12:00 pm: Work [schedule tasks here];

12:00 pm-1:00 pm: Lunch [do not schedule tasks here];

1:00 pm-5:00 pm: Work [schedule tasks here];

5:00 pm-5:30 pm: Drive Home [do not schedule tasks here, can be postponed by up to 15 minutes to complete a task].

As an example of how the user may interact with calendar 16 throughout Monday, the user initially arrives at work and pulls up their schedule. The current optimized schedule is shown in the below Table 1 and on UI 300 in FIG. 3.

TABLE 1

| Time | Work Day Outline | Optimized Tasks/Meetings |
|---|---|---|
| 7:30 am-8:00 am | Drive In | |
| 8:00 am-9:00 am | Meetings with Europe/Asia | Project Kick Off Meeting |
| 9:10 am-9:20 am | Meetings with Europe/Asia | Book Flight and Hotel for Off-Site Meeting in Paris |
| 9:30 am-11:30 am | Meetings with Europe/Asia (9:30 am-10:00 am) and Work (10:00 am-11:30 am) | Write Functional Specification for Sales Orders Module |
| 11:40 am-12:00 pm | Work | Write Up Project Kick Off Minutes |
| 12:00 pm-1:00 pm | Lunch | |
| 1:00 pm-3:00 pm | Work | Complete Patent Disclosure |
| 3:10 pm-3:30 pm | Work | Call John to discuss Infrastructure needed for New Release |
| 3:40 pm-3:55 pm | Work | Call Aquarium to see if they have Clown Fish |
| 4:05 pm-5:05 pm | Work | Work on Data Model Open Issues |
| 5:05 pm-5:30 pm | Drive Home | |

As shown in Table 1 above, optimization engine 36 has added the desired breaks between the tasks. As is also shown, optimization engine 36 has utilized the 9:00 am "slot" because there is no meeting scheduled. Since the "Meetings with Europe/Asia" Work Day Outline segment was set up to block out time up to 2 days before, and no meeting has been scheduled at 9:00 am, it can be utilized. As is also shown, the "Drive Home" segment was moved by 5 minutes to fit in the "Work on Data Model Open Issues" task, since "Drive Home" was allowed to move a maximum of 15 minutes.

Figure 4:
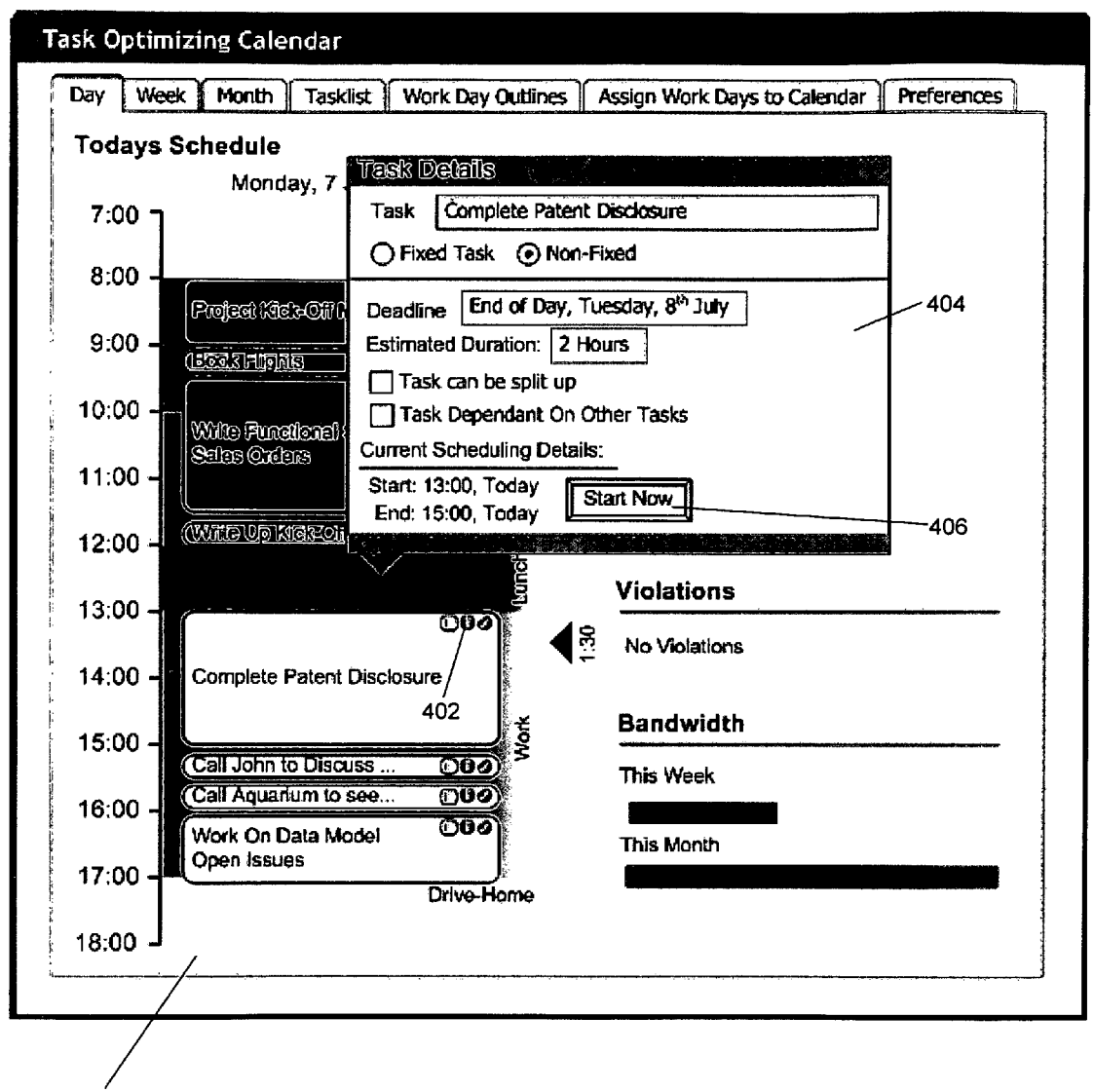
FIG. 4 illustrates the user interface after the user checks boxes for the three completed tasks.
Figure 5:
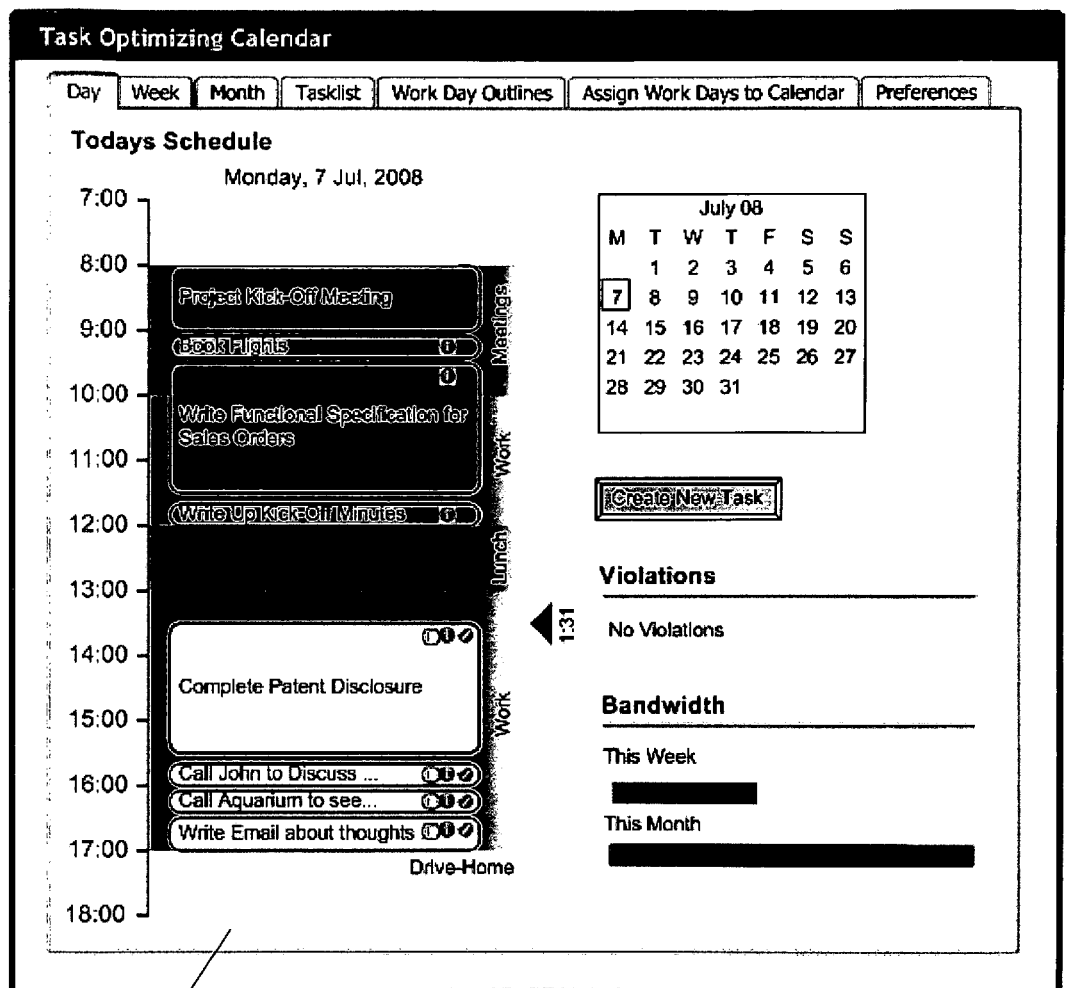
FIG. 5 illustrates the user interface with a re-optimized revised schedule.

The user then goes to the 8:00 am meeting and then begins the task that has been scheduled for 9:10 am: "Book Flight and Hotel for Off-Site Meeting in Paris". The user also completes "Write Functional Specification for Sales Orders Module" without incident. This is completed on time at 11:20 am, and the user takes a break. The user returns at 11:30 am to begin with the next task, which is "Write Up Project Kick Off Minutes". After 10 minutes, at 11:50 am, the user's manager calls to discuss something. After that, the user goes to lunch and gets back at 1:00 pm with the meeting minutes still to complete. The user then finishes writing up the minutes at 1:30 pm, and then goes to the schedule and checks the boxes on the three tasks that have been completed ("Book Flight and Hotel for Off-Site Meeting in Paris", "Write Functional Specification for Sales Orders Module" and "Write Up Project Kick Off Minutes"). FIG. 4 illustrates UI 300 after the user checks the boxes for the three completed tasks. As shown, the completed tasks change color or become gray to indicate that they have been completed. The user then clicks on the task details icon 402 of the "Complete Patent Disclosure" task that was scheduled for 1:00 pm, which opens up a task details window 404. Task details window 404 includes a "Start Now" button link that can be clicked by the user to reschedule the task to start from the current time. This has the effect of moving it forward and re-optimizing the rest of the day. FIG. 5 illustrates UI 300 with the re-optimized revised schedule. Table 2 below also illustrates the re-optimized revised schedule of FIG. 5.

TABLE 2

| Time | Daily Outline | Optimized Tasks/Meetings | Status |
|---|---|---|---|
| 7:30 am-8:00 am | Drive In | | |
| 8:00 am-9:00 am | Meetings with Europe/Asia | Project Kick Off Meeting | Complete |
| 9:00 am-9:30 am | Meetings with Europe/Asia | Book Flight and Hotel for Off-Site Meeting in Paris | Complete |
| 9:30 am-11:30 am | Meetings with Europe/Asia (9:30 am-10:00 am) and Work (10:00 am-11:30 am) | Write Functional Specification for Sales Orders Module | Complete |
| 11:30 am-12:00 pm | Work | Write Up Project Kick Off Minutes | Complete |
| 12:00 pm-1:30 pm | Lunch (12:00 pm-1:00 pm) and Work (1:00 pm-1:30 pm) | | |
| 1:30 pm-3:30 pm | Work | Complete Patent Disclosure | |
| 3:40 pm-4:00 pm | Work | Call John to discuss Infrastructure needed for New Release | |
| 4:00 pm-4:15 pm | Work | Call Aquarium to see if they have Clown Fish | |
| 4:30 pm-5:00 pm | Work | Write Email on thoughts on Group Model | |
| 5:00 pm-5:30 pm | Drive Home | | |

As shown, optimization engine 36 has chosen to swap the "Work on Data Model Open Issues" task with a shorter task ("Write Email on thoughts on Group Model") because the "Work on Data Model Open Issues" task required a minimum time commitment of 1 hour.

Figure 6:
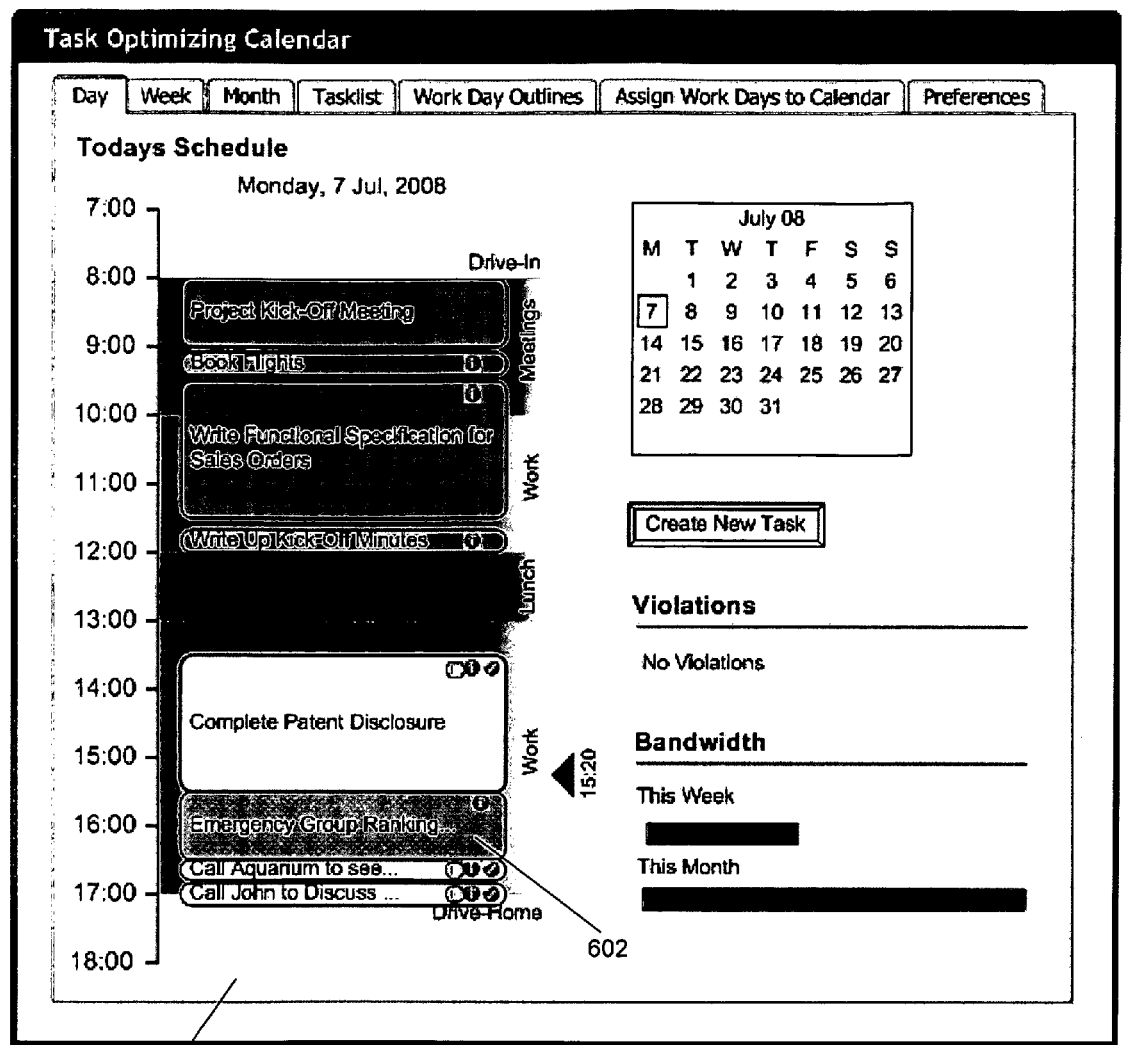
FIG. 6 illustrates the user interface that shows the current schedule and includes an added meeting.

Assume that the user works on the patent, but at 2:30 pm the user's manager calls to say that an emergency meeting has been scheduled at 3:30 pm and that the user needs to attend. At 3:20 pm, the user stops work on the patent disclosure and pulls up the calendar. FIG. 6 illustrates UI 300 that shows the current schedule and includes the meeting added by the manager at 602, also shown in Table 3 below.

TABLE 3

| Time | Daily Outline | Optimized Tasks/Meetings | Status |
|---|---|---|---|
| 7:30 am-8:00 am | Drive In | | |
| 8:00 am-9:00 am | Meetings with Europe/Asia | Project Kick Off Meeting | Complete |
| 9:00 am-9:30 am | Meetings with Europe/Asia | Book Flight and Hotel for Off-Site Meeting in Paris | Complete |
| 9:30 am-11:30 am | Meetings with Europe/Asia (9:30 am-10:00 am) and Work (10:00 am-11:30 am) | Write Functional Specification for Sales Orders Module | Complete |
| 11:30 am-12:00 pm | Work | Write Up Project Kick Off Minutes | Complete |
| 12:00 pm-1:30 pm | Lunch (12:00 pm-1:00 pm) and Work (1:00 pm-1:30 pm) | | |
| 1:30 pm-3:30 pm | Work | Complete Patent Disclosure | |
| 3:30 pm-4:30 pm | Work | Emergency Group Ranking Meeting | |
| 4:30 pm-4:45 pm | Work | Call Aquarium to see if they have Clown Fish | |
| 4:55 pm-5:15 pm | Work | Call John to discuss Infrastructure needed for New Release | |
| 5:15 pm-5:45 pm | Drive Home | | |

Figure 7:
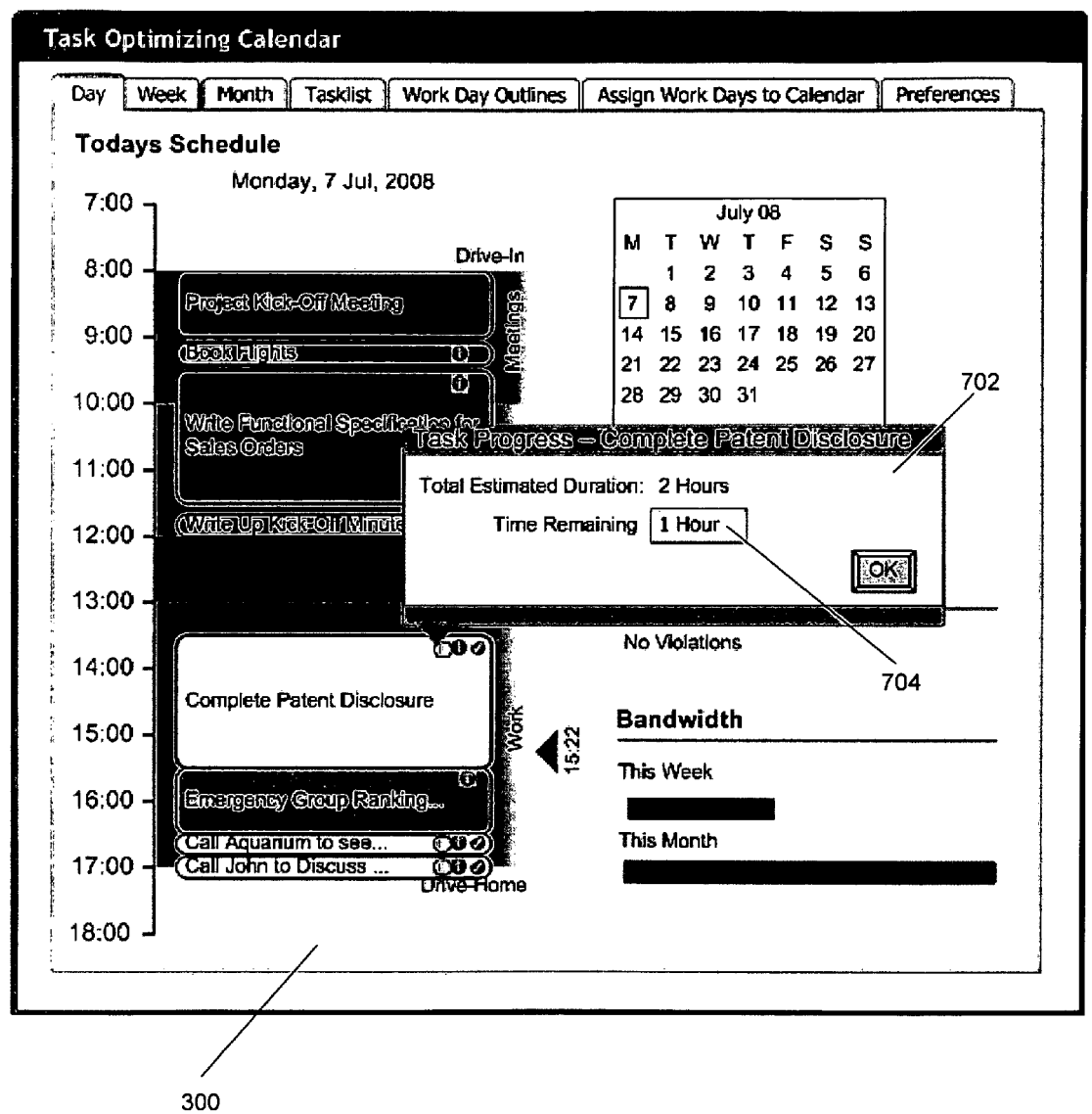
FIG. 7 illustrates the user interface with a task progress box.
Figure 8:
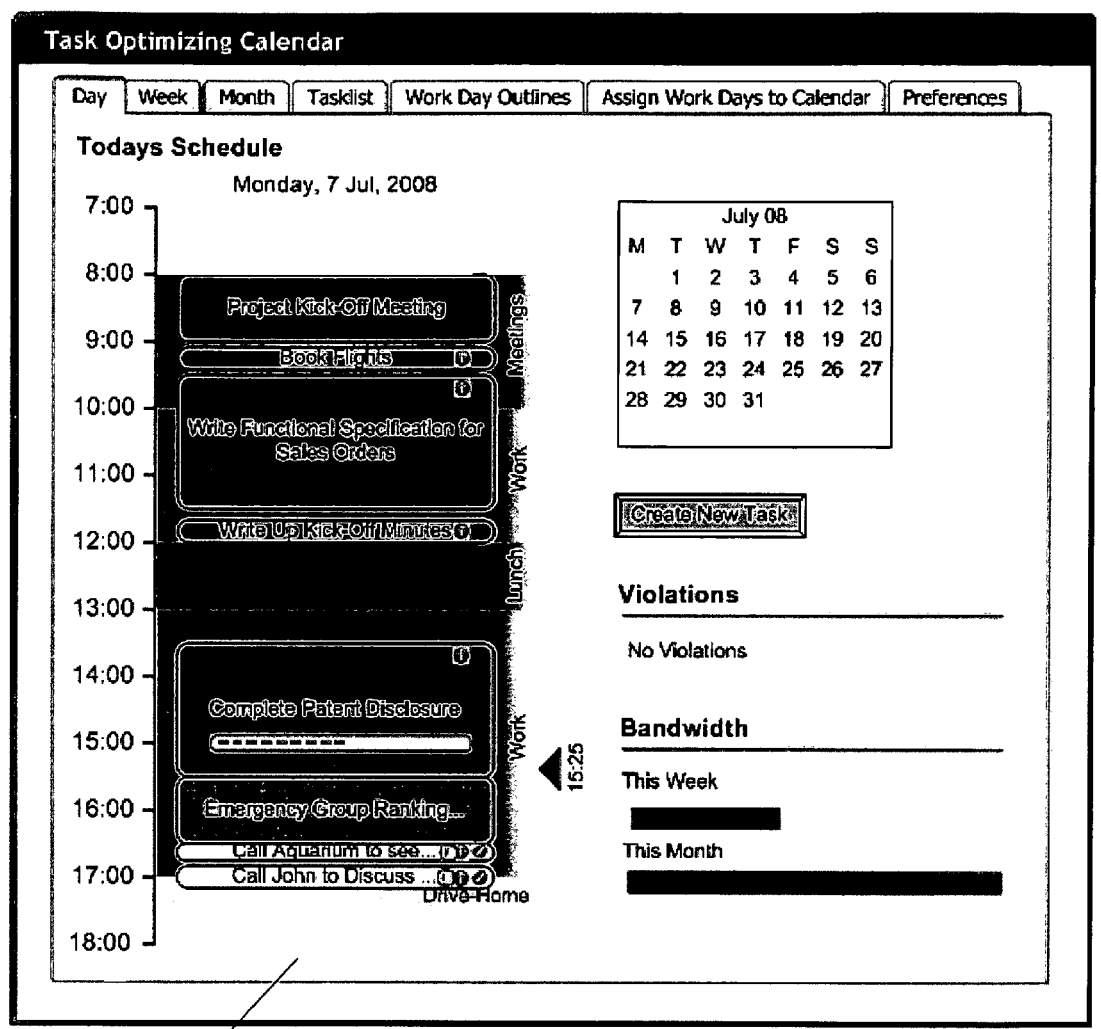
FIG. 8 illustrates the user interface with a re-optimized schedule.

Assume that the user determines that they need another hour or so on the patent to complete, but since they know that they have to go to the Emergency meeting now, they click the 'Task Progress' link on the 'Complete Patent Disclosure' task. FIG. 7 illustrates UI 300 with a task progress box 702 that opens up in response. Task progress box 702 allows the user to enter how much of the task is remaining in box 704. In the example, the user enters 1 hour. In response, the schedule is re-optimized. FIG. 8 illustrates UI 300 with the re-optimized schedule. Table 4 below also shows the re-optimized schedule.

TABLE 4

| Time | Daily Outline | Optimized Tasks/Meetings | Status |
|---|---|---|---|
| 7:30 am-8:00 am | Drive In | | |
| 8:00 am-9:00 am | Meetings with Europe/Asia | Project Kick Off Meeting | Complete |
| 9:00 am-9:30 am | Meetings with Europe/Asia | Book Flight and Hotel for Off-Site Meeting in Paris | Complete |
| 9:30 am-11:30 am | Meetings with Europe/Asia (9:30 am-10:00 am) and Work (10:00 am-11:30 am) | Write Functional Specification for Sales Orders Module | Complete |
| 11:30 am-12:00 pm | Work | Write Up Project Kick Off Minutes | Complete |
| 12:00 pm-1:30 pm | Lunch (12:00 pm-1:00 pm) and Work (1:00 pm-1:30 pm) | | |
| 1:30 pm-3:30 pm | Work | Complete Patent Disclosure | Partially Complete |
| 3:30 pm-4:30 pm | Work | Emergency Group Ranking Meeting | |
| 4:30 pm-4:45 pm | Work | Call Aquarium to see if they have Clown Fish | |
| 4:55 pm-5:15 pm | Work | Call John to discuss Infrastructure needed for New Release | |
| 5:15 pm-5:30 pm | Drive Home | | |

As shown, the patent work was not scheduled from 4:30 pm to 5:30 pm because both the "Call Aquarium to see if they have Clown Fish" task and the "Call John to discuss Infrastructure needed for New Release" task need to be completed on this day. Instead, optimization engine 36 has scheduled the rest of the patent work tomorrow. The user does not need to worry about this rescheduling because the user has set a deadline for the completion of the task and unless calendar 16 has notified the user of a deadline violation the user can be confident that tasks will be completed on time.

Figure 9:
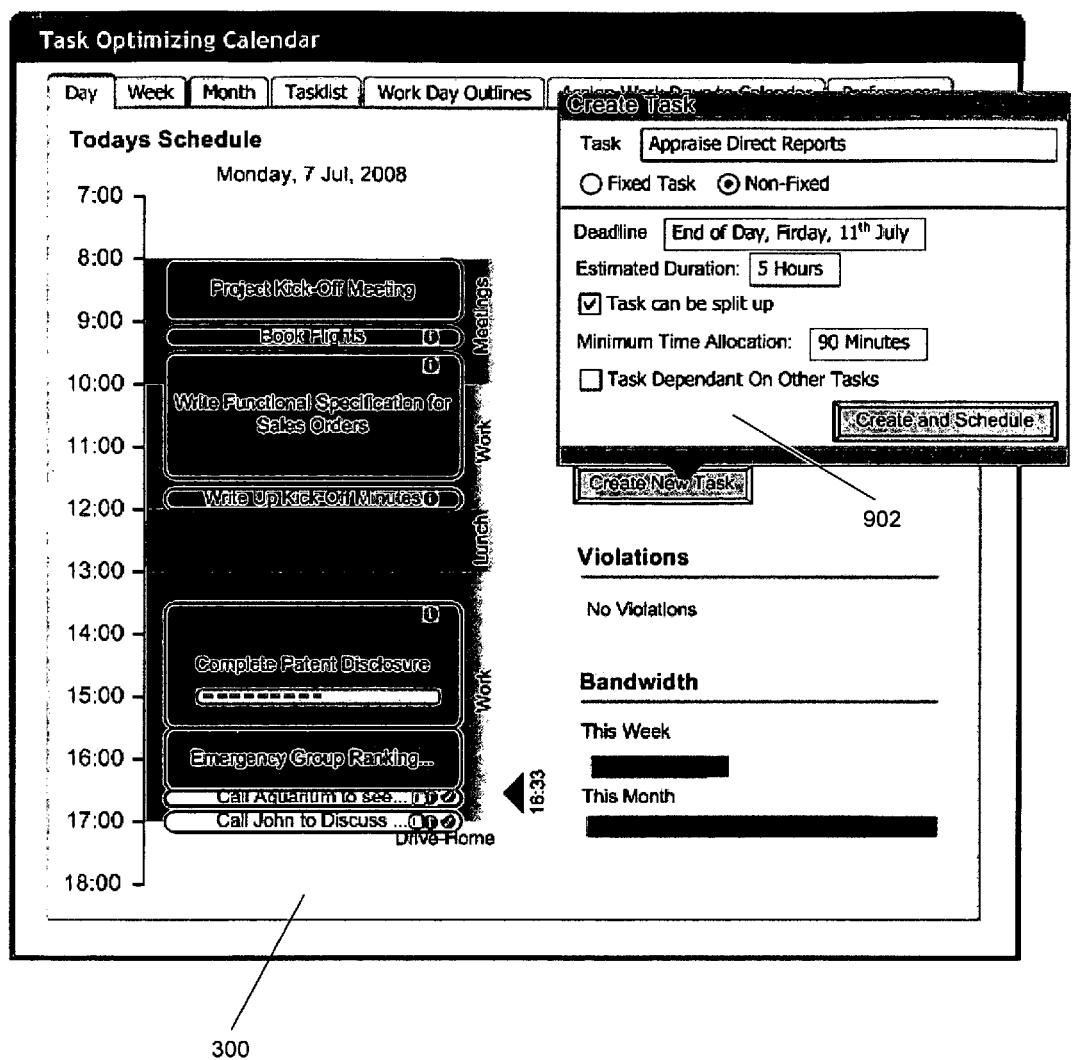
FIG. 9 illustrates the user interface with a create task box for adding a new task.
Figure 10:
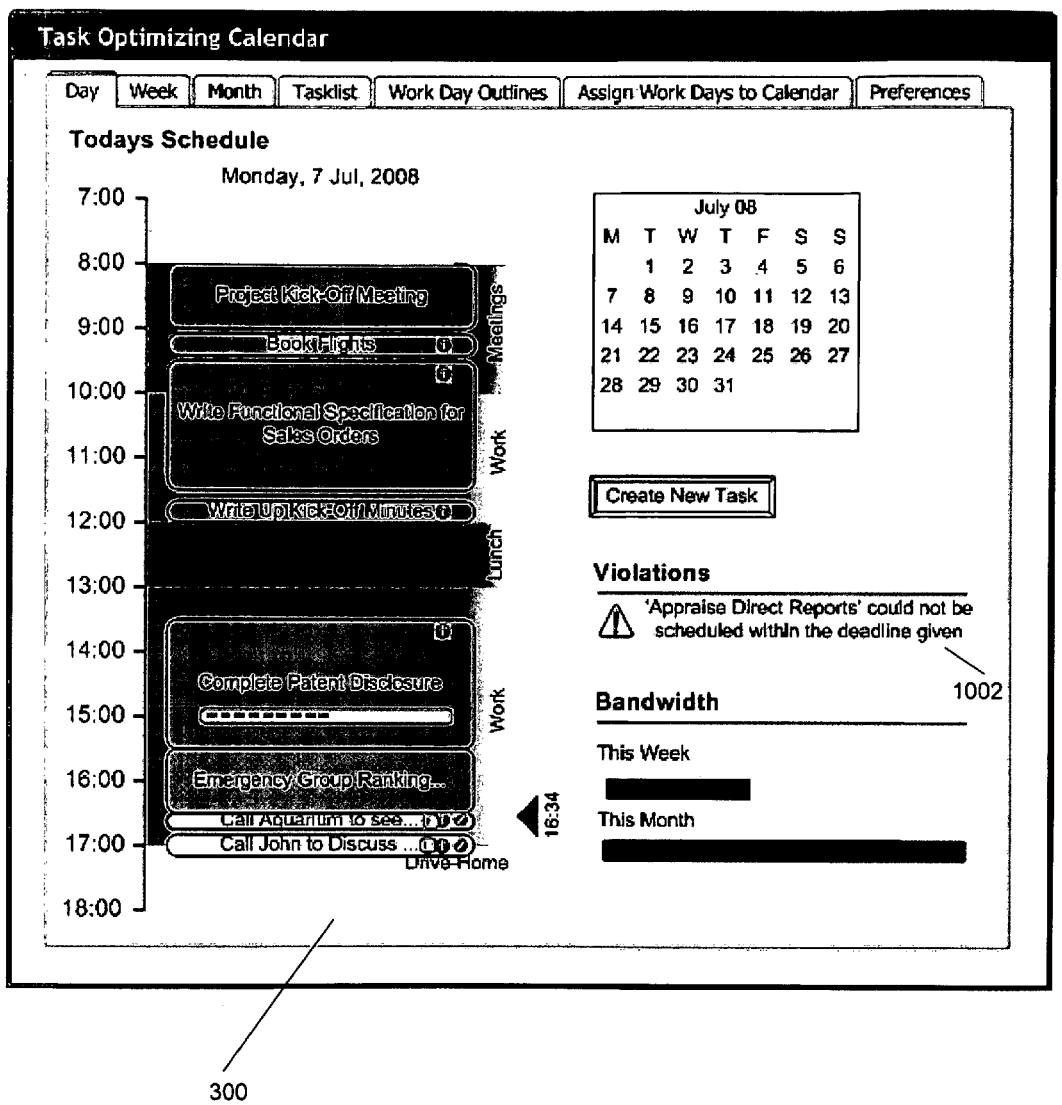
FIG. 10 illustrates the user interface with a violation message.

Assume at the 3:30 pm the meeting the user is assigned a new task ("Appraise Direct Reports") which must be completed by the end of the week. The user estimates that it will take 5 hours and adds it to the tasks. FIG. 9 illustrates UI 300 with a create task box 902 for adding the new task. Optimization engine 36 attempts to schedule this task by the deadline but determines that it can not be done. Therefore, optimization engine 36 generates a violation message. FIG. 10 illustrates UI 300 with the violation message 1002. In response to the violation message, the user calls their manager and together they decide that the "Work on Data Open Issues" task can be pushed out a couple of days. The user then updates the deadline for that task which allows the new task to be fully scheduled for the current week. Finally, the user completes the remaining tasks for the day by calling the Aquarium and John, and updating the calendar to note that those tasks are complete and it is time to go home.

Figure 11:
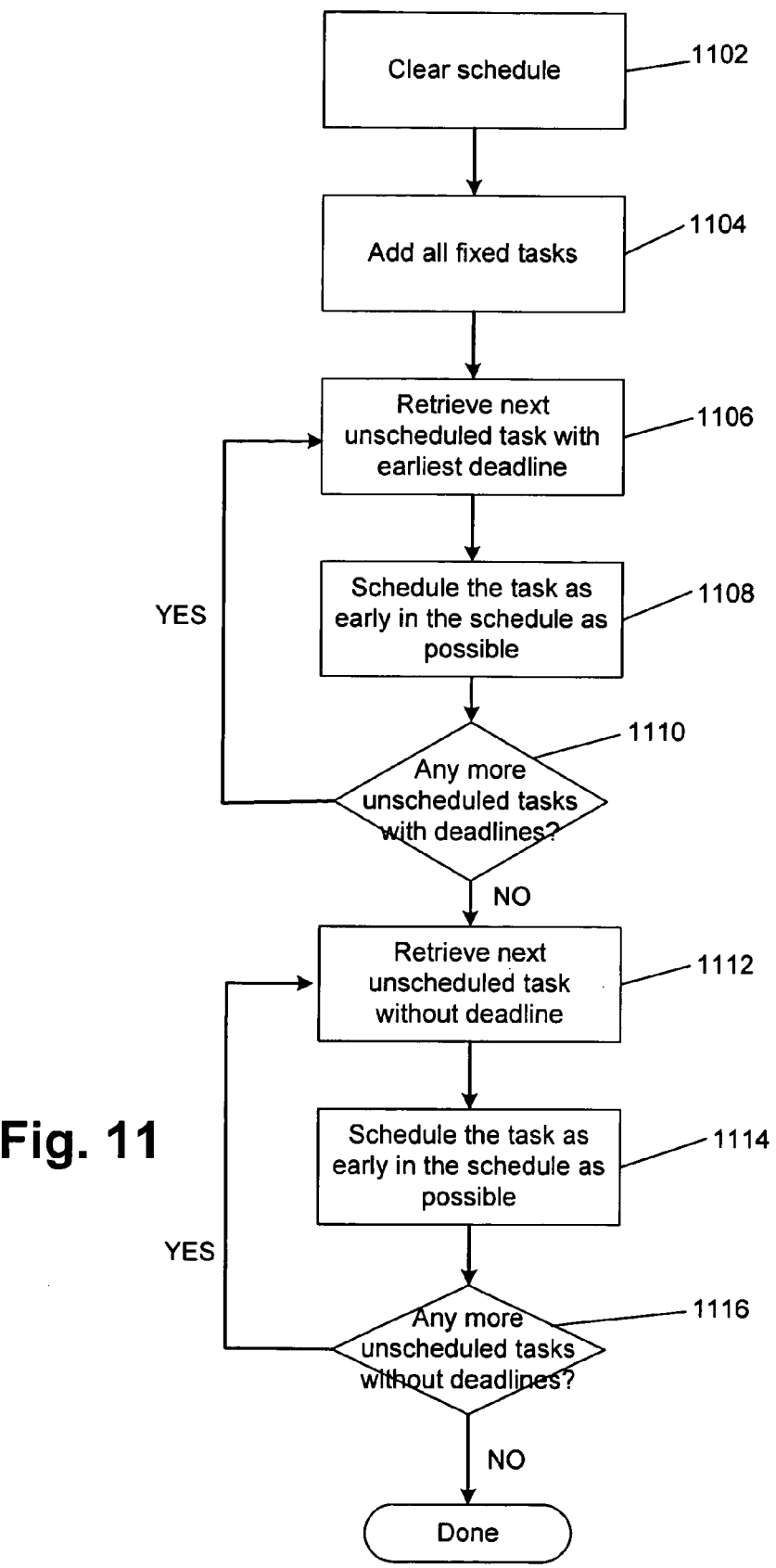
FIG. 11 is a flow diagram of the functionality of the calendar in accordance with one embodiment when optimizing a schedule.

FIG. 11 is a flow diagram of the functionality of calendar 16 in accordance with one embodiment when optimizing a schedule. In one embodiment, the functionality of the flow diagram of FIG. 11 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In addition to the optimization functionality of FIG. 11, other optimization techniques may be used for matching a capacity to do work with a workload (i.e., tasks for the user) subject to a series of constraints. The capacity to do work is received as the times the user denotes as available for the various types of tasks. Constraints include the user's optimization preferences, task deadlines, etc. In addition, it is assumed that no circular dependencies exist in the user's tasks. If a task is set up with a circular dependency, calendar 16 will issue an error message in one embodiment.

At 1102, optimization engine 36 starts by clearing the schedule so that no tasks are assigned to any periods of time.

At 1104, all of the fixed tasks, such as appointments and meetings, are added to the schedule.

At 1106, the next unscheduled task with the earliest deadline which has no dependencies on unscheduled tasks is retrieved. The unscheduled task can have a dependency on a task that is already present on the user's schedule.

At 1108, the retrieved task is scheduled as early in the schedule as possible given possible dependencies on other tasks already present on the user's schedule. If the task is dependent on another task, it will start after the completion of the task that it relies on. If the allocated slot in the schedule ends after the task deadline, a scheduling violation should be logged so the user can be alerted to the problem.

"Scheduling" a task includes finding a free space in the user's schedule and respecting scheduling preferences of the user, such as mandatory spacing between tasks. If the task can be split up, or is required to be split up, "scheduling" might include filling several non-contiguous empty slots in the calendar. The task is "scheduled" in one embodiment when enough time has been allocated on the calendar to cover the user's estimated time to complete the task.

At 1110, it is determined if there are any more unscheduled tasks with deadlines. If yes at 1110, the functionality continues at 1106. If no, at 1112 the next unscheduled task without a deadline which has no dependencies on unscheduled tasks is retrieved. The unscheduled task can have a dependency on a task that is already present on the user's schedule.

At 1114, the retrieved task is scheduled as early in the schedule as possible given possible dependencies on other tasks already present on the user's schedule. If the task is dependent on another task, it will start after the completion of the task that it relies on.

At 1116, it is determined if there are any more unscheduled tasks without deadlines. If yes at 1116, the functionality continues at 1112. If no, the functionality of FIG. 11 is complete.

As disclosed, embodiments include a calendar system in which a schedule is created based on user tasks. The tasks include enhanced information, such as estimated duration, deadlines, resources required, etc. The system further incorporates information about the user's workday such as working hours and work locations.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of scheduling for a user, the method comprising:
    retrieving a work capacity of the user, wherein the work capacity comprises working hours of the user;
    retrieving a plurality of prescheduled future events of the user, each prescheduled future event comprising a predetermined date and a predetermined starting time;
    retrieving a plurality of unscheduled enhanced tasks of the user; and
    optimizing a schedule for the user based on the work capacity, the plurality of prescheduled future events and the plurality of enhanced tasks of the user, wherein the optimizing the schedule comprises:
        adding the plurality of prescheduled future events to the schedule; and
        adding the unscheduled enhanced tasks that have no dependency on another unscheduled enhanced task as early in the schedule as possible after the plurality of prescheduled future events are added to the schedule,
    wherein the unscheduled enhanced tasks that have no dependency on another unscheduled enhanced task comprise:
    one or more first enhanced tasks that have a deadline; and
    one or more second enhanced tasks that have no deadline;
    wherein the adding the unscheduled enhanced tasks that have no dependency on another unscheduled enhanced task to the schedule comprises:
    adding the first enhanced tasks as early in the schedule as possible; and
    adding the second enhanced tasks as early in the schedule as possible after the first enhanced tasks are added to the schedule;
    wherein the unscheduled enhanced tasks that have no dependency on another unscheduled enhanced task comprise one or more third enhanced tasks that are dependent on a scheduled task, further comprising adding each third enhanced task to the schedule to start after a corresponding depended on scheduled task is completed.

2. The method of claim 1, wherein the work capacity further comprises at least one of working locations or working resources of the user.

3. The method of claim 1, wherein the an enhanced task comprises at least one of:
    an estimated task duration;
    dependency on other tasks; resources required.

4. The method of claim 1, wherein an enhanced task comprises at least one of:
    information on whether a task can be split up;
    delayed start information; or task classification.

5. The method of claim 1, wherein the optimizing the schedule further comprises clearing the schedule prior to adding the plurality of prescheduled future events to the schedule.

6. The method of claim 1, wherein the prescheduled future event comprises a meeting.

7. The method of claim 1, further comprising informing the user of violations during the optimization.

8. The method of claim 1, further comprising informing the user of a bandwidth for the user during a period of time.

9. A non-transitory computer readable medium having instructions stored thereon that, when executed by a processor, causes the processor to perform scheduling for a user, the instructions comprising:
instructions for retrieving a work capacity of the user, wherein the work capacity comprises working hours of the user;
instructions for retrieving a plurality of prescheduled future events of the user, each prescheduled future event comprising a predetermined date and a predetermined starting time;
instructions for retrieving a plurality of unscheduled enhanced tasks of the user; and
instructions for optimizing a schedule for the user based on the work capacity, the plurality of prescheduled future events, and the plurality of enhanced tasks;
wherein the instructions for optimizing the schedule for the user comprise:
instructions for adding the plurality of prescheduled future events to the schedule; and
instructions for adding the unscheduled enhanced tasks that have no dependency on another unscheduled enhanced task as early in the schedule as possible after the plurality of prescheduled future events are added to the schedule,
wherein the unscheduled enhanced tasks that have no dependency on another unscheduled enhanced task comprise:
one or more first enhanced tasks that have a deadline; and
one or more second enhanced tasks that have no deadline;
wherein the adding the unscheduled enhanced tasks that have no dependency on another unscheduled enhanced task to the schedule comprises:
adding the first enhanced tasks as early in the schedule as possible; and
adding the second enhanced tasks as early in the schedule as possible after the first enhanced tasks are added to the schedule;
wherein the unscheduled enhanced tasks that have no dependency on another unscheduled enhanced task comprise one or more third enhanced tasks that are dependent on a scheduled task, further comprising adding each third enhanced task to the schedule to start after a corresponding depended on scheduled task is completed.

10. The non-transitory computer readable medium of claim 9, wherein an unscheduled enhanced task comprises at least one of:
an estimated task duration;
dependency on other tasks;
resources required;
information on whether an unscheduled enhanced task can be split up;
delayed start information; or task classification.

11. The non-transitory computer readable medium of claim 9, wherein the optimizing the schedule further comprise clearing the schedule prior to adding the plurality of prescheduled future events to the schedule.

12. The non-transitory computer readable medium of claim 9, further comprising informing the user of a bandwidth for the user during a period of time.

13. A system for scheduling for a user, the system comprising:
a processor;
means executed by the processor for retrieving a work capacity of the user, wherein the work capacity comprises working hours of the user;
means executed by the processor for retrieving a plurality of prescheduled future events of the user, each prescheduled future event comprising a predetermined date and a predetermined starting time;
means executed by the processor for retrieving a plurality of unscheduled enhanced tasks of the user; and
means executed by the processor for optimizing a schedule for the user based on the work capacity, the plurality of prescheduled future events and the plurality of unscheduled enhanced tasks of the user,
wherein the means for optimizing comprises:
means for adding the plurality of prescheduled future events to the schedule; and means for adding the unscheduled enhanced tasks that have no dependency on another unscheduled enhanced task as early in the schedule as possible after the plurality of prescheduled future events are added to the schedule,
wherein the unscheduled enhanced tasks that have no dependency on another unscheduled enhanced task comprise:
one or more first enhanced tasks that have a deadline; and
one or more second enhanced tasks that have no deadline;
wherein the means for adding the unscheduled enhanced tasks that have no dependency on another unscheduled enhanced task to the schedule comprises:
adding the first enhanced tasks as early in the schedule as possible; and
adding the second enhanced tasks as early in the schedule as possible after the first enhanced tasks are added to the schedule;
wherein the unscheduled enhanced tasks that have no dependency on another unscheduled enhanced task comprise one or more third enhanced tasks that are dependent on a scheduled task, further comprising adding each third enhanced task to the schedule to start after a corresponding depended on scheduled task is completed.

14. A calendar system for a user comprising:
a processor coupled to a non-transitory computer readable medium having instruction stored thereon that are executed by the processor;
a work capacity module executed by the processor comprising the user's working hours stored in a data storage;
a workload module executed by the processor coupled to the work capacity module and comprising a plurality of prescheduled future events of the user and a plurality of unscheduled enhanced tasks of the user stored in the data storage, wherein each prescheduled future event comprises a predetermined date and a predetermined starting time; and
an optimization engine executed by the processor coupled to the work capacity module, wherein the optimization engine is adapted to optimize a schedule for the user using a processor based on the working hours, the plurality of prescheduled future events, and the plurality of unscheduled enhanced tasks of the user,
wherein the optimization engine is further adapted to:
add the plurality of prescheduled future events to the schedule; and add the unscheduled enhanced tasks that have no dependency on another unscheduled enhanced task as early in the schedule as possible after the plurality of prescheduled future events are added to the schedule, wherein the unscheduled enhanced tasks that have no dependency on another unscheduled enhanced task comprise:

one or more first enhanced tasks that have a deadline; and one or more second enhanced tasks that have no deadline;

wherein the adding the unscheduled enhanced tasks that have no dependency on another unscheduled enhanced task to the schedule comprises:

adding the first enhanced tasks as early in the schedule as possible; and adding the second enhanced tasks as early in the schedule as possible after the first enhanced tasks are added to the schedule;

wherein the unscheduled enhanced tasks that have no dependency on another unscheduled enhanced task comprise one or more third enhanced tasks that are dependent on a scheduled task, further comprising adding each third enhanced task to the schedule to start after a corresponding depended on scheduled task is completed.

15. The calendar system of claim 14, wherein an unscheduled enhanced task comprises at least one of:
an estimated task duration;
dependency on other tasks;
resources required;
information on whether an unscheduled enhanced task can be split up;
delayed start information; or task classification.

16. The system of claim 14, wherein the optimizing the schedule further comprises clearing the schedule prior to adding the plurality of prescheduled future events to the schedule.

* * * * *

UNITED STATES PATENT AND TRADEMARK OFFICE
CERTIFICATE OF CORRECTION

| | | |
|---|---|---|
| PATENT NO. | : 8,181,181 B2 | Page 1 of 1 |
| APPLICATION NO. | : 12/233994 | |
| DATED | : May 15, 2012 | |
| INVENTOR(S) | : Ioannou | |

It is certified that error appears in the above-identified patent and that said Letters Patent is hereby corrected as shown below:

On Title page, in column 2, under "Other Publications", line 17, delete ""eTaskSchedular"," and insert -- "eTaskScheduler", --, therefor.

In column 10, line 56, in Claim 3, after "wherein" delete "the".

In column 10, line 59, in Claim 3, after "tasks;" insert -- or --.

In column 11, line 62, in Claim 11, delete "comprise" and insert -- comprises --, therefor.

Signed and Sealed this
Seventh Day of August, 2012

David J. Kappos
*Director of the United States Patent and Trademark Office*